US009646592B2

(12) United States Patent
Eronen et al.

(10) Patent No.: US 9,646,592 B2
(45) Date of Patent: May 9, 2017

(54) AUDIO SIGNAL ANALYSIS

(71) Applicant: Nokia Technologies Oy, Espoo (FI)

(72) Inventors: Antti Johannes Eronen, Tampere (FI); Igor Danilo Diego Curcio, Tampere (FI); Jussi Artturi Leppänen, Tampere (FI); Elina Elisabet Helander, Tampere (FI); Victor Popa, Bucharest (RO); Katariina Jutta Mahkonen, Toijala (FI); Tuomas Oskari Virtanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/769,797

(22) PCT Filed: Feb. 28, 2013

(86) PCT No.: PCT/IB2013/051599
§ 371 (c)(1),
(2) Date: Aug. 21, 2015

(87) PCT Pub. No.: WO2014/132102
PCT Pub. Date: Sep. 4, 2014

(65) Prior Publication Data

US 2016/0027421 A1 Jan. 28, 2016

(51) Int. Cl.
*G10H 1/00* (2006.01)
*H04B 3/20* (2006.01)
(Continued)

(52) U.S. Cl.
CPC ............... *G10H 1/40* (2013.01); *G10H 1/366* (2013.01); *G10H 1/368* (2013.01);
(Continued)

(58) Field of Classification Search
CPC .......... G10H 1/40; G10H 1/366; G10H 1/368; G10H 2210/071; G10H 2210/056;
(Continued)

(56) References Cited

U.S. PATENT DOCUMENTS 7,612,275 B2 11/2009 Seppanen et al.
8,265,290 B2 9/2012 Nakajima et al.
(Continued)

FOREIGN PATENT DOCUMENTS

WO 2013/164661 A1 11/2013
WO 2014/001849 A1 1/2014

OTHER PUBLICATIONS

Furuya et al., "Robust Speech Dereverberation Using Multichannel Blind Deconvolution With Spectral Subtraction", IEEE Transactions on Audio, Speech, and Language Processing, vol. 15, No. 5, Jul. 2007, pp. 1579-1591.
(Continued)

*Primary Examiner* — Muhammad N Edun
(74) *Attorney, Agent, or Firm* — Nokia Technologies Oy

(57) ABSTRACT

An apparatus comprises a dereverberation module for generating a dereverberated audio signal based on an original audio signal containing reverberation, and an audio-analysis module for generating audio analysis data based on audio analysis of the original audio signal and audio analysis of the dereverberated audio signal.

20 Claims, 9 Drawing Sheets

(51) Int. Cl.

| | |
|---|---|
| ***G10H 1/40*** | (2006.01) |
| ***G10L 25/48*** | (2013.01) |
| ***G10H 1/36*** | (2006.01) |
| *G10L 21/0208* | (2013.01) |

(52) U.S. Cl.
CPC .......... *G10L 21/0208* (2013.01); *G10L 25/48* (2013.01); *G10H 2210/056* (2013.01); *G10H 2210/066* (2013.01); *G10H 2210/071* (2013.01); *G10H 2210/076* (2013.01); *G10H 2210/281* (2013.01); *G10H 2240/251* (2013.01); *G10L 2021/02082* (2013.01)

(58) Field of Classification Search
CPC ....... G10H 2240/251; G10H 2210/066; G10H 2210/281; G10H 2210/076; G10L 21/0208; G10L 25/48; G10L 2021/02082
See application file for complete search history.

(56) References Cited

U.S. PATENT DOCUMENTS

| | | | | |
|---|---|---|---|---|
| 2004/0068401 | A1 | 4/2004 | Herre et al. | |
| 2009/0117948 | A1* | 5/2009 | Buck | 455/570 |
| 2011/0002473 | A1 | 1/2011 | Nakatani et al. | |
| 2011/0036231 | A1* | 2/2011 | Nakadai | G10H 1/361 84/477 R |
| 2013/0129099 | A1* | 5/2013 | Kondo | G10K 15/12 381/63 |
| 2013/0147923 | A1* | 6/2013 | Zhou | H04B 3/20 348/47 |
| 2013/0223660 | A1* | 8/2013 | Olafsson | H04R 25/407 381/313 |

OTHER PUBLICATIONS

Virtanen,"Audio Signal Modeling With Sinusoids Plus Noise", Thesis, Mar. 2001, 73 pages.

Tsilfidis et al., "Blind Single-Channel Suppression of Late Reverberation Based on Perceptual Reverberation Modeling", The Journal of the Acoustical Society of America, vol. 129, No. 3, Mar. 2011, pp. 1439-1451.

Vincent et al., "Performance Measurement in Blind Audio Source Separation", IEEE Transactions on Audio, Speech, and Language Processing, vol. 14, No. 4, Jul. 2006, pp. 1462-1469.

Benesty et al.,"Springer Handbook of Speech Processing", Springer Handbook, 2008, 1161 pages.

"A Toolbox for Performance Measurement In (blind) Source Separation", BSS Eval, Retrieved on Jul. 29, 2016, Webpage available at : http://bass-db.gforge.inria.fr/bss_eval/.

Ellis, "Beat Tracking by Dynamic Programming", Journal of New Music Research, vol. 36, No. 1, 2007 21 pages.

Eronen et al., "Music Tempo Estimation With K-NN Regression", IEEE Transactions on Audio, Speech, and Language Processing, vol. 18, No. 1, Jan. 2010, pp. 50-57.

Klapuri, "Multiple fundamental frequency estimation by summing harmonic Amplitudes", In Proceedings of the 7th International Conference on Music Information Retrieval, Oct. 8-12, 2006, 6 pages.

Scheirer et al.,"Construction and Evaluation of a Robust Multi Feature Speech/Music Discriminator", IEEE International Conference on Acoustics, Speech, and Signal Processing, vol. 2, Apr. 21-24, 1997, pp. 1331-1334.

Extended European Search Report received for corresponding European Patent Application No. 13876530.0, dated Jun. 27, 2016, 6 pages.

"Aachen Impulse Response Database", RWTH Aachen, Retrieved on Aug. 23, 2016, Webpage available at : http://www.ind.rwth-aachen.de/en/research/speech-and-audio-processing/aachen-impulse-response-database/.

International Search Report and Written Opinion received for corresponding Patent Cooperation Treaty Application No. PCT/IB2013/051599, dated Nov. 15, 2013, 14 pages.

Yasuraoka, N. et al. "Music dereverberation using harmonic structure source model and wiener filter", IEEE Int Conf. on Acoustics, Speech and signal Processing, Dallas, USA, Mar. 14-19, 2010, pp. 53-56.

Tsilfidis A. et al. "Blind estimation and suppression of late reverberation utilizing auditory masking", Joint Workshop on Hands-free Speech Communnication and Microphone Arrays, Trento, italy, May 6-8, 2008. pp. 208-211.

Muller M. et al. "Signal Processing for Music Analysis", IEEE Journal of Selected Topics in Signal Processing, vol. 5, No. 6, Oct. 2011, pp. 1088-1100.

* cited by examiner

AUDIO SIGNAL ANALYSIS

RELATED APPLICATION

This application was originally filed as PCT Application No. PCT/IB2013/051599 filed Feb. 28, 2013.

FIELD

Embodiments of the invention relate to audio analysis of audio signals. In particular, but not exclusively, some embodiments relate to the use of dereverberation in the audio analysis of audio signals.

BACKGROUND

Music can include many different audio characteristics such as beats, downbeats, chords, melodies and timbre. There are a number of practical applications for which it is desirable to identify these audio characteristics from a musical audio signal. Such applications include music recommendation applications in which music similar to a reference track is searched for, in Disk Jockey (DJ) applications where, for example, seamless beat-mixed transitions between songs in a playlist is required, and in automatic looping techniques.

A particularly useful application has been identified in the use of downbeats to help synchronise automatic video scene cuts to musically meaningful points. For example, where multiple video (with audio) clips are acquired from different sources relating to the same musical performance, it would be desirable to automatically join clips from the different sources and provide switches between the video clips in an aesthetically pleasing manner, resembling the way professional music videos are created. In this case it is advantageous to synchronize switches between video shots to musical downbeats.

The following terms may be useful for understanding certain concepts to be described later.

Pitch: the physiological correlate of the fundamental frequency ($f_0$) of a note.

Chroma: musical pitches separated by an integer number of octaves belong to a common chroma (also known as pitch class). In Western music, twelve pitch classes are used.

Beat: the basic unit of time in music—it can be considered the rate at which most people would tap their foot on the floor when listening to a piece of music. The word is also used to denote part of the music belonging to a single beat. A beat is sometimes also referred to as a tactus.

Tempo: the rate of the beat or tactus pulse represented in units of beats per minute (BPM). The inverse of tempo is sometimes referred as beat period.

Bar: a segment of time defined as a given number of beats of given duration. For example, in music with a 4/4 time signature, each bar (or measure) comprises four beats.

Downbeat: the first beat of a bar or measure.

Reverberation: the persistence of sound in a particular space after the original sound is produced.

Human perception of musical meter involves inferring a regular pattern of pulses from moments of musical stress, a.k.a. accents. Accents are caused by various events in the music, including the beginnings of all discrete sound events, especially the onsets of long pitched sounds, sudden changes in loudness or timbre, and harmonic changes. Automatic tempo, beat, or downbeat estimators may try to imitate the human perception of music meter to some extent, by measuring musical accentuation, estimating the periods and phases of the underlying pulses, and choosing the level corresponding to the tempo or some other metrical level of interest. Since accents relate to events in music, accent based audio analysis refers to the detection of events and/or changes in music. Such changes may relate to changes in the loudness, spectrum, and/or pitch content of the signal. As an example, accent based analysis may relate to detecting spectral change from the signal, calculating a novelty or an onset detection function from the signal, detecting discrete onsets from the signal, or detecting changes in pitch and/or harmonic content of the signal, for example, using chroma features. When performing the spectral change detection, various transforms or filter bank decompositions may be used, such as the Fast Fourier Transform or multi-rate filter banks, or even fundamental frequency $f_o$ or pitch salience estimators.

As a simple example, accent detection might be performed by calculating the short-time energy of the signal over a set of frequency bands in short frames over the signal, and then calculating difference, such as the Euclidean distance, between every two adjacent frames. To increase the robustness for various music types, many different accent signal analysis methods have been developed.

Reverberation is a natural phenomenon and occurs when a sound is produced in an enclosed space. This may occur, for example, when a band is playing in a large room with hard walls. When a sound is produced in an enclosed space, a large number of echoes build up and then slowly decay as the walls and air absorb the sound. Rooms which are designed for music playback are usually specifically designed to have desired reverberation characteristics. A certain amount and type of reverberation makes music listening pleasing and is desirable in a concert hall, for example. However, if the reverberation is very heavy, for example, in a room which is not designed for acoustic behaviour or where the acoustic design has not been successful, music may sound smeared and unpleasing. Even the intelligibility of speech may be decreased in this kind of situation. Furthermore, reverberation decreases the accuracy of automatic music analysis algorithms such as onset detection. To improve the situation, dereverberation methods have been developed. These methods process the audio signal containing reverberation and try to cancel the reverberation effect to recover the quality of the audio signal.

The system and method to be described hereafter draws on background knowledge described in the following publications which are incorporated herein by reference.

[1] Furuya K. and Kataoka, A. Robust speech dereverberation using multichannel blind deconvolution with spectral subtraction, *IEEE Trans. On Audio, Speech, and Language Processing*, Vol. 15, No. 5, July 2007.

[2] Virtanen, T. Audio signal modeling with sinusoids plus noise, *MSc Thesis*, Tampere University of Technology, 2001. (http://www.cs.tut.fi/sgn/arg/music/tuomasv/MScThesis.pdf)

[3] Tsilfidis, A. and Mourjopoulus, J. Blind single-channel suppression of late reverberation based on perceptual reverberation modeling, *Journal of the Acoustical Society of America*, vol. 129, no 3, 2011.

[4] Daniel P. W. Ellis, "Beat Tracking by Dynamic Programming", Journal of New Music Research, Vol. 36, No. 1, pp. 51-60, 2007. (http://www.ee.columbia.edu/~dpwe/pubs/Ellis07-beattrack.pdf).

[5] Jarno Seppänen, Antti Eronen, Jarmo Hiipakka (Nokia Corporation)—U.S. Pat. No. 7,612,275 "Method, apparatus and computer program product for providing rhythm information from an audio signal" (11 Nov. 2009)

[6] Eronen, A. J. and Klapuri, A. P., "Music Tempo Estimation with k-NN regression", IEEE Transactions on Audio, Speech, and Language Processing, Vol. 18, No. 1, pp. 50-57, 2010.

[7] U.S. Pat. No. 8,265,290 (Honda Motor Co Ltd)—"Dereverberation System and Dereverberation Method"

[8] Yasuraoka, Yoshioka, Nakatani, Nakamura, Okuno, "Music dereverberation using harmonic structure source model and Wiener filter", Proceedings of ICASSP 2010.

[9] A. Klapuri, "Multiple fundamental frequency estimation by summing harmonic amplitudes," in Proc. 7th Int. Conf. Music Inf. Retrieval (ISMIR-06), Victoria, Canada, 2006.

[10] Eric Scheirer, Malcolm Slaney, "Construction and evaluation of a robust multifeature speech/music discriminator", Proc. IEEE Int. Conf. on Acoustic, Speech, and Signal Processing, ICASSP-97, Vol. 2, pp. 1331-1334, 1997.

SUMMARY

In a first aspect, this specification describes apparatus comprising: a dereverberation module for generating a dereverberated audio signal based on an original audio signal containing reverberation; and an audio-analysis module for generating audio analysis data based on audio analysis of the original audio signal and audio analysis of the dereverberated audio signal.

The audio analysis module may be configured to perform audio analysis using the original audio signal and the dereverberated audio signal. The audio analysis module may be configured to perform audio analysis on one of original audio signal and the dereverberated audio signal based on results of the audio analysis of the other one of the original audio signal and the dereverberated audio signal. The audio analysis module may be configured to perform audio analysis on the original audio signal based on results of the audio analysis of the dereverberated audio signal.

The dereverberation module may be configured to generate the dereverberated audio signal based on results of the audio analysis of the original audio signal.

The audio analysis module may be configured to perform one of: beat period determination analysis; beat time determination analysis; downbeat determination analysis; structure analysis; chord analysis; key determination analysis; melody analysis; multi-pitch analysis; automatic music transcription analysis; audio event recognition analysis; and timbre analysis, in respect of at least one of the original audio signal and the dereverberated audio signal. The audio analysis module may be configured to perform beat period determination analysis on the dereverberated audio signal and to perform beat time determination analysis on the original audio signal. The audio analysis module may be configured to perform the beat time determination analysis on the original audio signal based on results of the beat period determination analysis.

The audio analysis module may be configured to analyse the original audio signal to determine if the original audio signal is derived from speech or from music and to perform the audio analysis in respect of the dereverberated audio signal based on the determination as to whether the original audio signal is derived from speech or from music. Parameters used in the dereverberation of the original signal may be selected on the basis of the determination as to whether the original audio signal is derived from speech or from music.

The dereverberation module may be configured to process the original audio signal using sinusoidal modeling prior to generating the dereverberated audio signal. The dereverberation module may configured to use sinusoidal modeling to separate the original audio signal into a sinusoidal component and a noisy residual component, to apply a dereverberation algorithm to the noisy residual component to generate a dereverberated noisy residual component, and to sum the sinusoidal component to the dereverberated noisy residual component thereby to generate the dereverberated audio signal.

In a second aspect, this specification describes a method comprising: generating a dereverberated audio signal based on an original audio signal containing reverberation; and generating audio analysis data based on audio analysis of the original audio signal and audio analysis of the dereverberated audio signal.

The method may comprise performing audio analysis using the original audio signal and the dereverberated audio signal. The method may comprise performing audio analysis on one of original audio signal and the dereverberated audio signal based on results of the audio analysis of the other one of the original audio signal and the dereverberated audio signal. The method may comprise performing audio analysis on the original audio signal based on results of the audio analysis of the dereverberated audio signal.

The method may comprise generating the dereverberated audio signal based on results of the audio analysis of the original audio signal.

The method may comprise performing one of: beat period determination analysis; beat time determination analysis; downbeat determination analysis; structure analysis; chord analysis; key determination analysis; melody analysis; multi-pitch analysis; automatic music transcription analysis; audio event recognition analysis; and timbre analysis, in respect of at least one of the original audio signal and the dereverberated audio signal. The method may comprise performing beat period determination analysis on the dereverberated audio signal and performing beat time determination analysis on the original audio signal. The method may comprise performing beat time determination analysis on the original audio signal based on results of the beat period determination analysis.

The method may comprise analysing the original audio signal to determine if the original audio signal is derived from speech or from music and performing the audio analysis in respect of the dereverberated audio signal based on the determination as to whether the original audio signal is derived from speech or from music. The method may comprise selecting parameters used in the dereverberation of the original signal on the basis of the determination as to whether the original audio signal is derived from speech or from music.

The method may comprise processing the original audio signal using sinusoidal modeling prior to generating the dereverberated audio signal. The method may comprise: using sinusoidal modeling to separate the original audio signal into a sinusoidal component and a noisy residual component; applying a dereverberation algorithm to the noisy residual component to generate a dereverberated noisy residual component; and summing the sinusoidal component to the dereverberated noisy residual component thereby to generate the dereverberated audio signal.

In a third aspect, this specification describes Apparatus comprising: at least one processor; and at least one memory, having computer-readable code stored thereon, the at least one memory and the computer program code being configured to, with the at least one processor, cause the apparatus: to generate a dereverberated audio signal based on an original audio signal containing reverberation; and to generate audio analysis data based on audio analysis of the original audio signal and audio analysis of the dereverberated audio signal.

The at least one memory and the computer program code may be configured to, with the at least one processor, cause the apparatus to perform audio analysis using the original audio signal and the dereverberated audio signal. The at least one memory and the computer program code may be configured to, with the at least one processor, cause the apparatus to perform audio analysis on one of original audio signal and the dereverberated audio signal based on results of the audio analysis of the other one of the original audio signal and the dereverberated audio signal. The at least one memory and the computer program code may be configured to, with the at least one processor, cause the apparatus to perform audio analysis on the original audio signal based on results of the audio analysis of the dereverberated audio signal.

The at least one memory and the computer program code may be configured to, with the at least one processor, cause the apparatus to generate the dereverberated audio signal based on results of the audio analysis of the original audio signal.

The at least one memory and the computer program code may be configured to, with the at least one processor, cause the apparatus: to perform one of: beat period determination analysis; beat time determination analysis; downbeat determination analysis; structure analysis; chord analysis; key determination analysis; melody analysis; multi-pitch analysis; automatic music transcription analysis; audio event recognition analysis; and timbre analysis, in respect of at least one of the original audio signal and the dereverberated audio signal. The at least one memory and the computer program code may be configured to, with the at least one processor, cause the apparatus to perform beat period determination analysis on the dereverberated audio signal and to perform beat time determination analysis on the original audio signal.

The at least one memory and the computer program code may be configured to, with the at least one processor, cause the apparatus to perform the beat time determination analysis on the original audio signal based on results of the beat period determination analysis.

The at least one memory and the computer program code may be configured to, with the at least one processor, cause the apparatus: to analyse the original audio signal to determine if the original audio signal is derived from speech or from music; and to perform the audio analysis in respect of the dereverberated audio signal based upon the determination as to whether the original audio signal is derived from speech or from music.

The at least one memory and the computer program code may be configured to, with the at least one processor, cause the apparatus to select the parameters used in the dereverberation of the original signal on the basis of the determination as to whether the original audio signal is derived from speech or from music.

The at least one memory and the computer program code may be configured to, with the at least one processor, cause the apparatus to process the original audio signal using sinusoidal modeling prior to generating the dereverberated audio signal. The at least one memory and the computer program code may be configured to, with the at least one processor, cause the apparatus: to use sinusoidal modeling to separate the original audio signal into a sinusoidal component and a noisy residual component; to apply a dereverberation algorithm to the noisy residual component to generate a dereverberated noisy residual component; and to sum the sinusoidal component to the dereverberated noisy residual component thereby to generate the dereverberated audio signal.

In a fourth aspect, this specification describes apparatus comprising: means for generating a dereverberated audio signal based on an original audio signal containing reverberation; and means for generating audio analysis data based on audio analysis of the original audio signal and audio analysis of the dereverberated audio signal.

The apparatus may comprise means for performing audio analysis using the original audio signal and the dereverberated audio signal. The apparatus may comprise means for performing audio analysis on one of original audio signal and the dereverberated audio signal based on results of the audio analysis of the other one of the original audio signal and the dereverberated audio signal. The apparatus may comprise means for performing audio analysis on the original audio signal based on results of the audio analysis of the dereverberated audio signal.

The apparatus may comprise means for generating the dereverberated audio signal based on results of the audio analysis of the original audio signal.

The apparatus may comprise means for performing one of: beat period determination analysis; beat time determination analysis; downbeat determination analysis; structure analysis; chord analysis; key determination analysis; melody analysis; multi-pitch analysis; automatic music transcription analysis; audio event recognition analysis; and timbre analysis, in respect of at least one of the original audio signal and the dereverberated audio signal. The apparatus may comprise means for performing beat period determination analysis on the dereverberated audio signal and means for performing beat time determination analysis on the original audio signal. The apparatus may comprise means for performing beat time determination analysis on the original audio signal based on results of the beat period determination analysis.

The apparatus may comprise means for analysing the original audio signal to determine if the original audio signal is derived from speech or from music and means for performing the audio analysis in respect of the dereverberated audio signal based on the determination as to whether the original audio signal is derived from speech or from music. The apparatus may comprise means for selecting parameters used in the dereverberation of the original signal on the basis of the determination as to whether the original audio signal is derived from speech or from music.

The apparatus may comprise means for processing the original audio signal using sinusoidal modeling prior to generating the dereverberated audio signal. The apparatus may comprise: means for using sinusoidal modeling to separate the original audio signal into a sinusoidal component and a noisy residual component; means for applying a dereverberation algorithm to the noisy residual component to generate a dereverberated noisy residual component; and means for summing the sinusoidal component to the dereverberated noisy residual component thereby to generate the dereverberated audio signal.

In a fifth aspect, this specification describes computer-readable code which, when executed by computing apparatus, causes the computing apparatus to perform a method according to the second aspect.

In a sixth aspect, this specification describes at least one non-transitory computer-readable memory medium having computer-readable code stored thereon, the computer-read-able code being configured to cause computing apparatus: to generate a dereverberated audio signal based on an original audio signal containing reverberation; and to generate audio analysis data based on audio analysis of the original audio signal and audio analysis of the dereverberated audio signal.

In a seventh aspect, this specification describes apparatus comprising a dereverberation module configured: to use sinusoidal modeling to generate a dereverberated audio signal based on an original audio signal containing reverberation.

The dereverberation module may be configured to: use sinusoidal modeling to separate the original audio signal into a sinusoidal component and a noisy residual component; to apply a dereverberation algorithm to the noisy residual component to generate a dereverberated noisy residual component; and to sum the sinusoidal component to the dereverberated noisy residual component thereby to generate the dereverberated audio signal.

BRIEF DESCRIPTION OF THE DRAWINGS

Embodiments of the invention will now be described by way of non-limiting example with reference to the accompanying drawings, in which.

DETAILED DESCRIPTION OF EMBODIMENTS

Embodiments described below relate to systems and methods for audio analysis, primarily the analysis of music. The analysis may include, but is not limited to, analysis of musical meter in order to identify beat, downbeat, or structural event times. Music and other audio signals recorded in live situations often include an amount of reverberation. This reverberation can sometimes have a negative impact on the accuracy of audio analysis, such as that mentioned above, performed in respect of the recorded signals. In particular, the accuracy in determining the times of beats and downbeats can be adversely affected as the onset structure is "smeared" by the reverberation. Some of the embodiments described herein provide improved accuracy in audio analysis, for example, in determination of beat and downbeat times in music audio signals including reverberation. An audio signal which includes reverberation may be referred to as a reverberated signal.

The specific embodiments described below relate to a video editing system which automatically edits video clips using audio characteristic identified in their associated audio track. However, it will, of course be appreciated that systems and methods described herein may also be used for other applications such as, but not limited to, creation of audio synchronized visualizations, beat-synchronized mixing of audio signals, and content-based searches of recorded live content.

Figure 1:
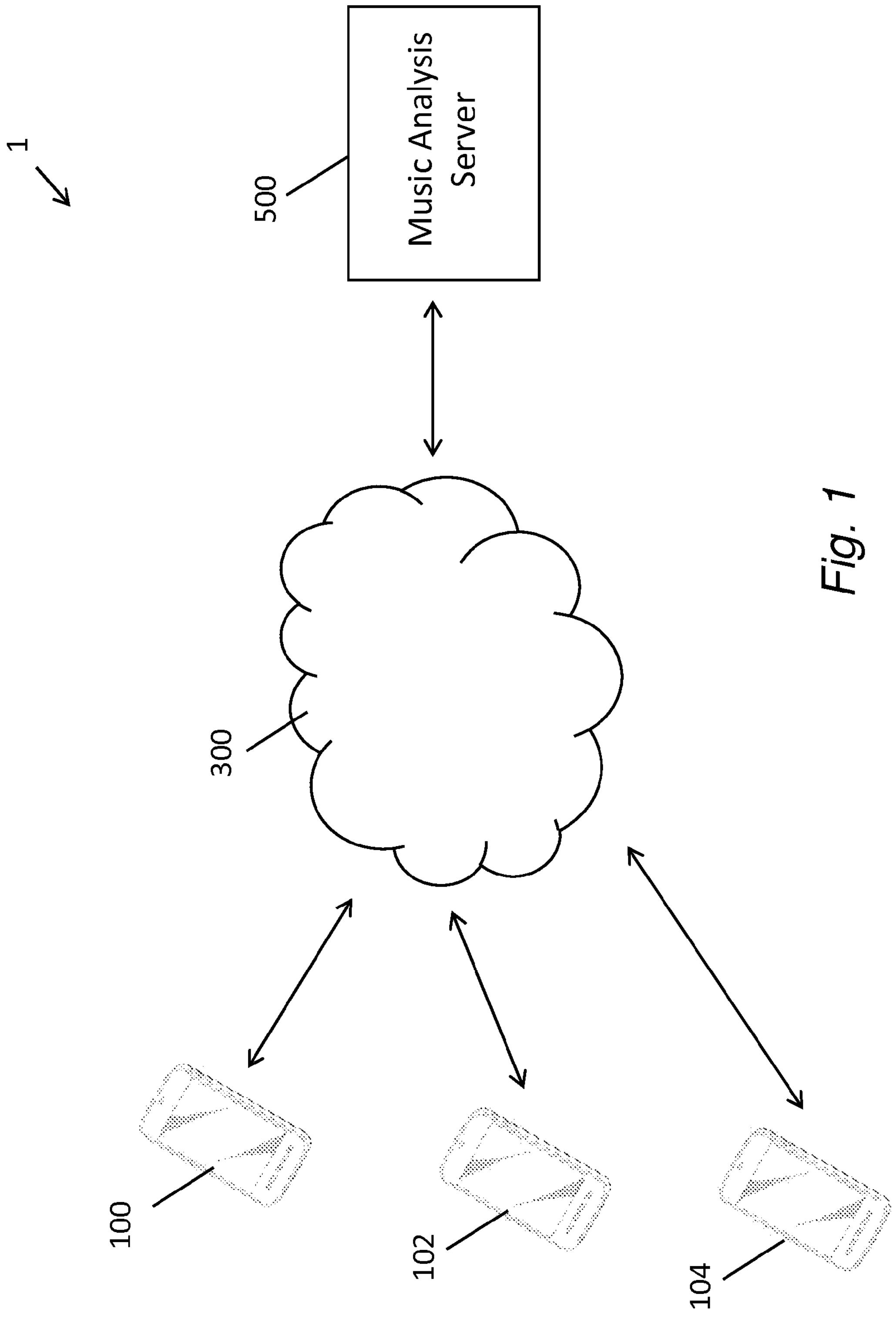
FIG. 1 is a schematic diagram of a network including a music analysis server according to the invention and a plurality of terminals.

Referring to FIG. 1, an audio analysis server 500 (hereafter "analysis server") is shown connected to a network 300, which can be any data network such as a Local Area Network (LAN), Wide Area Network (WAN) or the Internet. The analysis server 500 is, in this specific non-limiting example, configured to process and analyse audio signals associated with received video clips in order to identify audio characteristics, such as beats or downbeats, for the purpose of, for example, automated video editing. The audio analysis/processing is described in more detail later on.

External terminals 100, 102, 104 in use communicate with the analysis server 500 via the network 300, in order to upload or upstream video clips having an associated audio track. In the present case, the terminals 100, 102, 104 incorporate video camera and audio capture (i.e. microphone) hardware and software for the capturing, storing, uploading, downloading, upstreaming and downstreaming of video data over the network 300.

Figure 2:
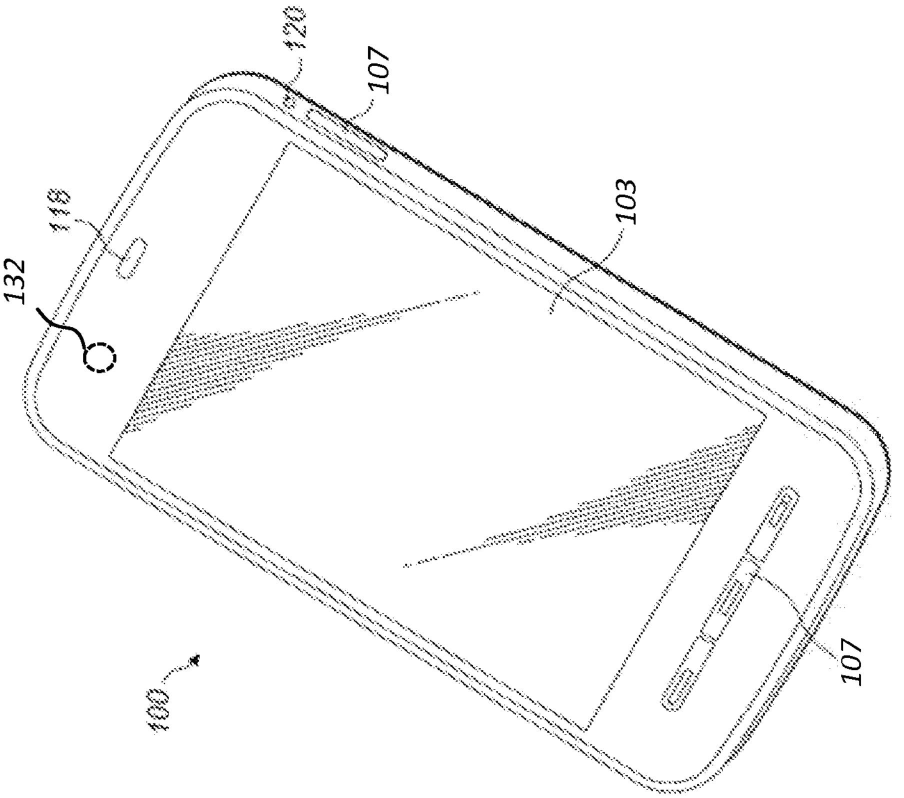
FIG. 2 is a perspective view of one of the terminals shown in FIG. 1.

Referring to FIG. 2, one of said terminals 100 is shown, although the other terminals 102, 104 are considered identical or similar. The exterior of the terminal 100 has a touch sensitive display 103, hardware keys 107, a rear-facing camera 105, a speaker 118 and a headphone port 120.

Figure 3:
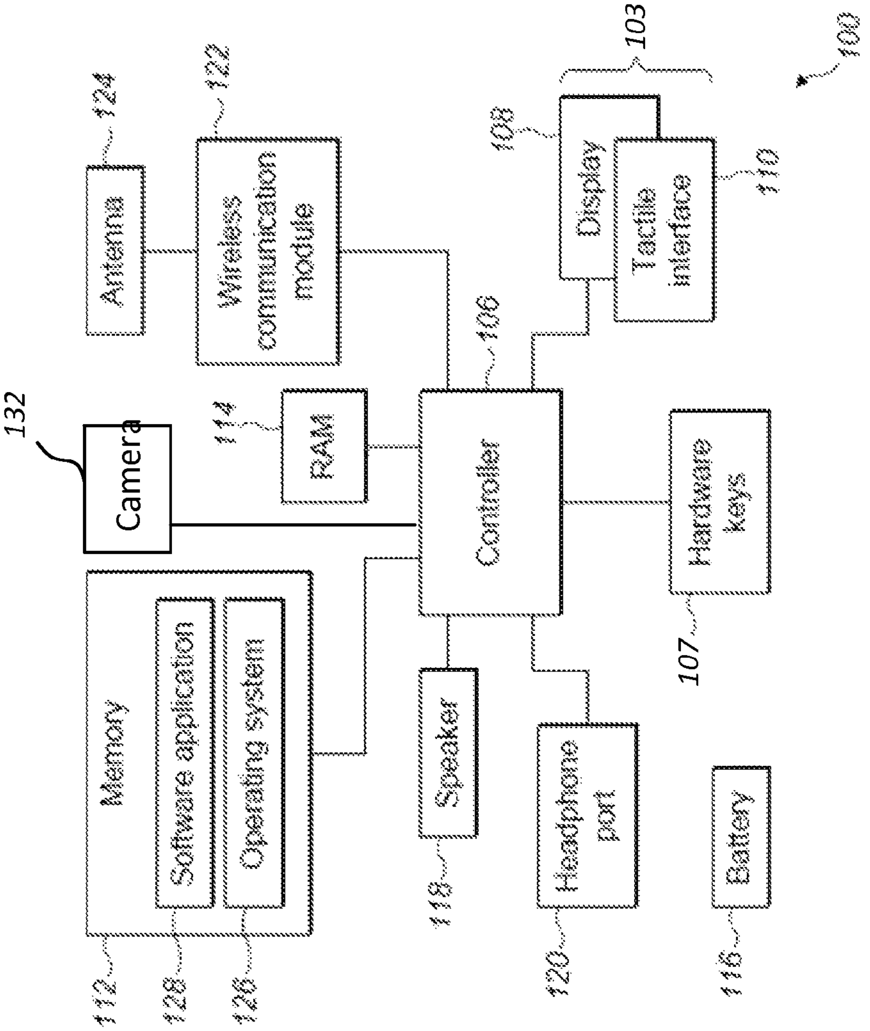
FIG. 3 is a schematic diagram of components of the terminal shown in FIG. 2.

FIG. 3 shows a schematic diagram of the components of terminal 100. The terminal 100 has a controller 106, a touch sensitive display 103 comprised of a display part 108 and a tactile interface part 110, the hardware keys 107, the camera 132, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may comprise any combination of microcontrollers, processors, microprocessors, field-programmable gate arrays (FPGAs) and application specific integrated circuits (ASICs).

The terminal 100 may be a mobile telephone or smartphone, a personal digital assistant (PDA), a portable media player (PMP), a portable computer, such as a laptop or a tablet, or any other device capable of running software applications and providing audio outputs. In some embodiments, the terminal 100 may engage in cellular communications using the wireless communications module 122 and the antenna 124. The wireless communications module 122 may be configured to communicate via several protocols such as Global System for Mobile Communications (GSM), Code Division Multiple Access (CDMA), Universal Mobile Telecommunications System (UMTS), Bluetooth and IEEE 802.11 (Wi-Fi).

The display part 108 of the touch sensitive display 103 is for displaying images and text to users of the terminal and the tactile interface part 110 is for receiving touch inputs from users.

As well as storing the operating system 126 and software applications 128, the memory 112 may also store multimedia files such as music and video files. A wide variety of software applications 128 may be installed on the terminal including Web browsers, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software applications not stored on the terminal. These may be applications stored on a remote server device and may run partly or exclusively on the remote server device. These applications can be termed cloud-hosted applications. The terminal 100 may be in communication with the remote server device in order to utilise the software applications stored there. This may include receiving audio outputs provided by the external software application.

In some embodiments, the hardware keys 107 are dedicated volume control keys or switches. The hardware keys may for example comprise two adjacent keys, a single rocker switch or a rotary dial. In some embodiments, the hardware keys 107 are located on the side of the terminal 100.

One of said software applications 128 stored on memory 112 is a dedicated application (or "App") configured to upload or upstream captured video clips, including their associated audio track, to the analysis server 500.

The analysis server 500 is configured to receive video clips from the terminals 100, 102, 104 and to identify audio characteristics, such as downbeats, in each associated audio track for the purposes of automatic video processing and editing, for example to join clips together at musically meaningful points. Instead of identifying audio characteristics in each associated audio track, the analysis server 500 may be configured to analyse the audio characteristics in a common audio track which has been obtained by combining parts from the audio track of one or more video clips.

Figure 4:
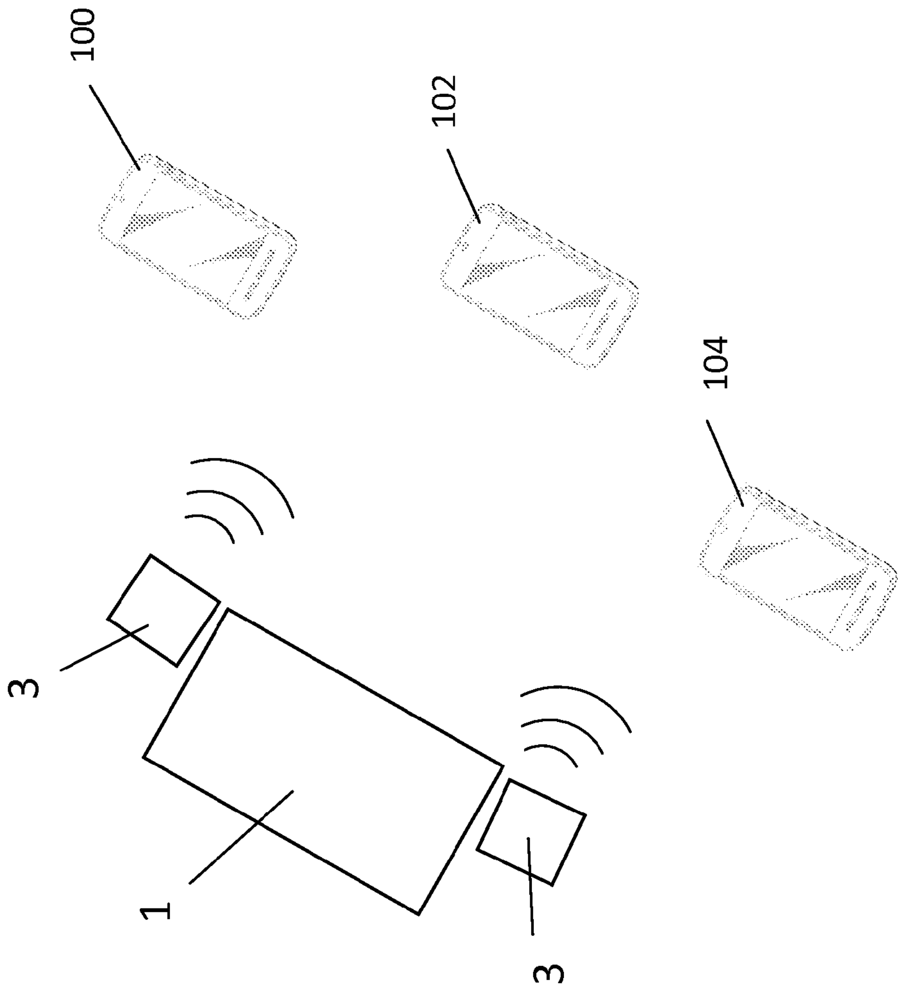
FIG. 4 is a schematic diagram showing the terminals of FIG. 1 when used at a common musical event.

Referring to FIG. 4, a practical example will now be described. Each of the terminals 100, 102, 104 is shown in use at an event which is a music concert represented by a stage area 1 and speakers 3. Each terminal 100, 102, 104 is assumed to be capturing the event using their respective video cameras; given the different positions of the terminals 100, 102, 104 the respective video clips will be different but there will be a common audio track providing they are all capturing over a common time period.

Users of the terminals 100, 102, 104 subsequently upload or upstream their video clips to the analysis server 500, either using their above-mentioned App or from a computer with which the terminal synchronises. At the same time, users are prompted to identify the event, either by entering a description of the event, or by selecting an already-registered event from a pull-down menu. Alternative identification methods may be envisaged, for example by using associated GPS data from the terminals 100, 102, 104 to identify the capture location.

At the analysis server 500, received video clips from the terminals 100, 102, 104 are identified as being associated with a common event. Subsequent analysis of the audio signal associated with each video clip can then be performed to identify audio characteristics which may be used to select video angle switching points for automated video editing.

Figure 5:
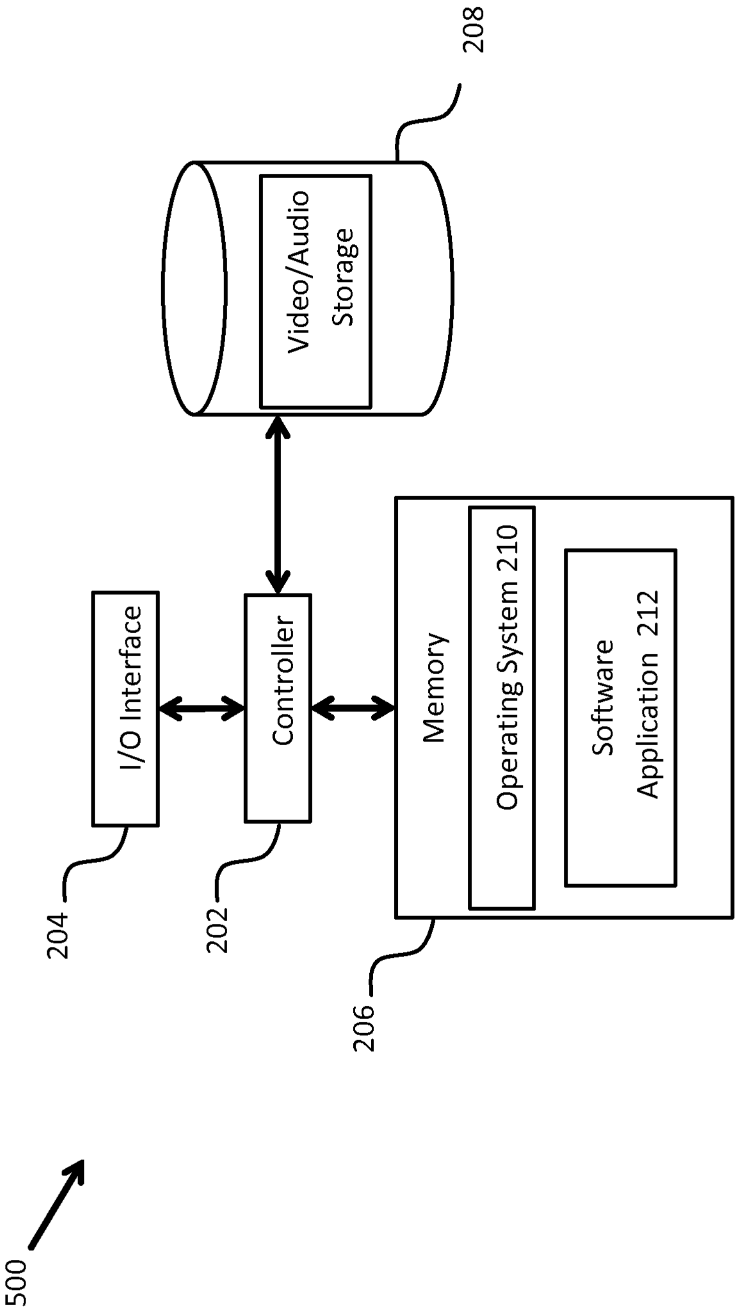
FIG. 5 is a schematic diagram of components of the analysis server shown in FIG. 1.

Referring to FIG. 5, hardware components of the analysis server 500 are shown. These include a controller 202, an input and output interface 204, a memory 206 and a mass storage device 208 for storing received video and audio clips. The controller 202 is connected to each of the other components in order to control operation thereof.

The memory 206 (and mass storage device 208) may be a non-volatile memory such as read only memory (ROM) a hard disk drive (HDD) or a solid state drive (SSD). The memory 206 stores, amongst other things, an operating system 210 and may store software applications 212. RAM (not shown) is used by the controller 202 for the temporary storage of data. The operating system 210 may contain code which, when executed by the controller 202 in conjunction with RAM, controls operation of each of the hardware components.

The controller 202 may take any suitable form. For instance, it may be any combination of microcontrollers, processors, microprocessors, FPGAs and ASICs.

The software application 212 is configured to control and perform the processing of the audio signals, for example, to identify audio characteristics. This may alternatively be performed using a hardware-level implementation as opposed to software or a combination of both hardware and software. Whether the processing of audio signals is performed by apparatus comprising at least one processor configured to execute the software application 212, a purely hardware apparatus or by an apparatus comprising a combination of hardware and software elements, the apparatus may be referred to as an audio signal processing apparatus.

Figure 6:
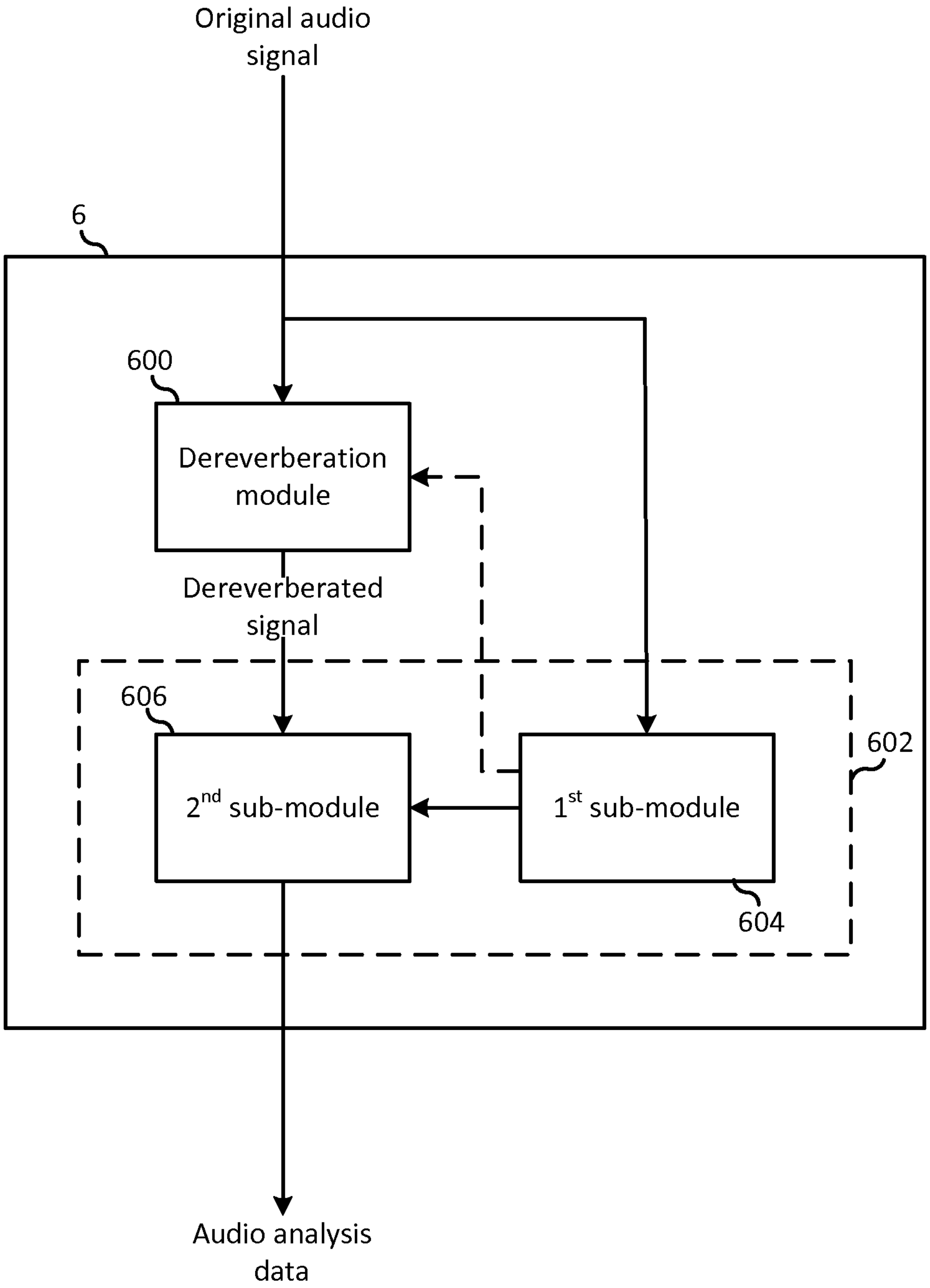
FIG. 6 is a schematic block diagram showing functional elements for performing audio signal processing in accordance with various embodiments.

FIG. 6 is a schematic illustration of audio signal processing apparatus 6, which forms part of the analysis server 500. The figure shows examples of the functional elements or modules 602, 604, 606, 608 which are together configured to perform audio processing of audio signals. The figure also shows the transfer of data between the functional modules 602, 604, 606, 608. As will of course be appreciated, each of the modules may be a software module, a hardware module or a combination of software and hardware. Where the apparatus 6 comprises one or more software modules these may comprise computer-readable code portions that are part of a single application (e.g. application 212) or multiple applications.

In FIG. 6, the audio signal processing apparatus 6 comprises a dereverberation module 600 configured to perform dereverberation on an original audio signal which contains reverberation. The result of the dereverberation is a dereverberated audio signal. The dereverberation process is discussed in more detail below.

The audio signal processing apparatus 6 also comprises an audio analysis module 602. The audio analysis module 602 is configured to generate audio analysis data based on audio analysis of the original audio signal and on audio analysis of the dereverberated audio signal. The audio analysis module 602 is configured to perform the audio analysis using both the original audio signal and the dereverberated audio signal.

The audio analysis module 602 may be configured to perform a multi-step, or multi-part, audio analysis process. In such examples, the audio analysis module 602 may be configured to perform one or more parts, or steps, of the analysis based on the original audio signal and one or more other parts of the analysis based on the dereverberated signal. In the example of FIG. 6, the audio analysis module 602 is configured to perform a first step of an analysis process on the original audio signal, and to use the output of the first step when performing a second step of the process on the dereverberated audio signal. Put another way, the audio-analysis module 602 may be configured to perform audio analysis on the dereverberated audio signal based on results of the audio analysis of the original audio signal, thereby to generate the audio analysis data.

The audio analysis module 602, in this example, comprises first and second sub-modules 604, 606. The first sub-module 604 is configured to perform audio analysis on the original audio signal. The second sub-module 606 is configured to perform audio analysis on the dereverberated audio signal. In the example of FIG. 6, the second sub-module 606 is configured to perform the audio analysis on the dereverberated signal using the output of the first sub-module 604. Put another way, the second sub-module 606 is configured to perform the audio analysis on the dereverberated signal based on the results of the analysis performed by the first sub-module 604.

In some embodiments, the dereverberation module 600 may be configured to receive the results of the audio analysis on the original audio signal and to perform the dereverberation on the audio signal based on these results. Put another way, the dereverberation module 600 may be configured to receive, as an input, the output of the first sub-module 604. This flow of data is illustrated by the dashed line in FIG. 6.

Figure 7:
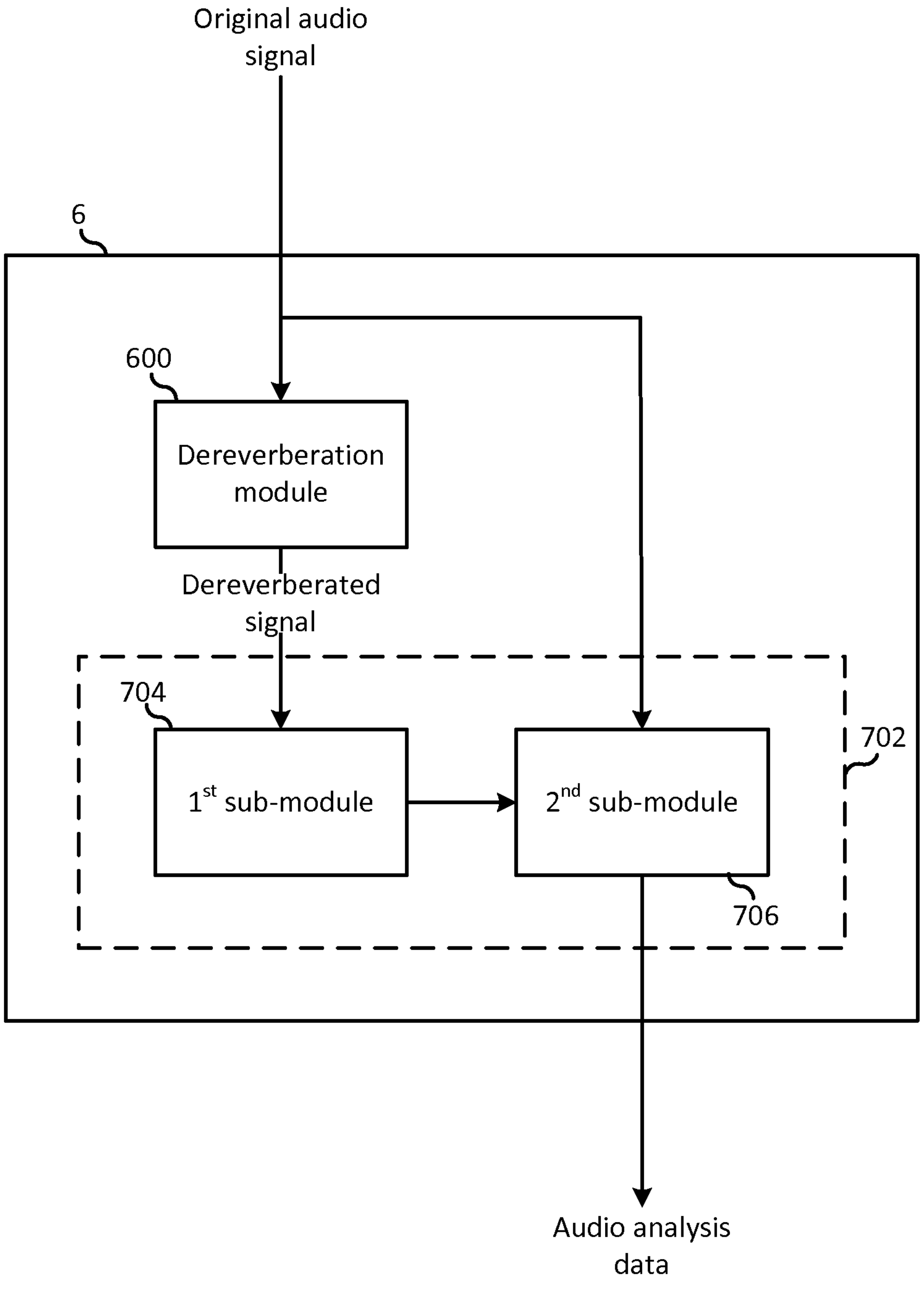
FIG. 7 is a schematic block diagram showing functional elements for performing audio signal processing in accordance with other embodiments.

Another example of audio signal processing apparatus is depicted schematically in FIG. 7. The apparatus may be the same as that of FIG. 6 except that the first sub-module 704 of the audio analysis module 702 is configured to perform audio analysis on the dereverberated audio signal and the second sub-module 706 is configured to perform audio analysis on the original audio signal. In addition, the second sub-module 706 is configured to perform the audio analysis on the original audio signal using the output of the first sub-module 704 (i.e. the results of the audio analysis performed in respect of the dereverberated signal).

The audio analysis performed by the audio analysis modules 602, 702 of either of FIG. 6 or 7 may comprise one or more of, but is not limited to: beat period (or tempo) determination analysis; beat time determination analysis; downbeat determination analysis; structure analysis; chord analysis; key determination analysis; melody analysis; multi-pitch analysis; automatic music transcription analysis; audio event recognition analysis; and timbre analysis.

The audio analysis modules 602, 702 may be configured to perform different types of audio analysis in respect of each of the original and dereverberated audio signals. Put another way, the first and second sub-modules may be configured to perform different types of audio analysis. The different types of audio analysis may be parts or steps of a multi-part, or multi-step analysis process. For example, a first step of an audio analysis process may be performed on one of the dereverberated signal and the original audio signal and a second step of the audio analysis process may be performed on the other one of the dereverberated signal and the original audio signal. In some examples the output (or results) of the first step of audio analysis may be utilized when performing a second step of audio analysis process. For example, the apparatus of FIG. 7 may be configured such that the beat period determination analysis (sometimes also referred to as tempo analysis) is performed by the first sub-module 704 on the dereverberated signal, and such that the second sub-module 706 performs beat time determination analysis on the original audio signal containing reverberation using the estimated beat period output by the first sub-module 704. Put another way, beat period determination analysis may be performed in respect of the dereverberated audio signal and the results of this may be used when performing beat time determination analysis in respect of the original audio signal.

In some examples, the audio analysis module 602, 702 may be configured to identify at least one of downbeats and structural boundaries in the original audio signal based on results of beat time determination analysis.

The audio analysis data, which is generated or output by the audio signal processing apparatus 6, 7 and which may comprise, for example, downbeat times or structural boundary times, may be used, for example by the analysis server 500 of which the audio signal processing apparatus 6, 7 is part, in at least one of automatic video editing, audio synchronized visualizations, and beat-synchronized mixing of audio signals.

Performing audio analysis using both the original audio signal and the dereverberated audio signal improves accuracy when performing certain types of analysis. For example, the inventors have noticed improved accuracy when beat period (BPM) analysis is performed using the dereverberated signal and then beat and/or downbeat time determination analysis is performed on the original audio signal using the results of the beat period analysis. More specifically, the inventors have noticed improved accuracy when performing beat period determination analysis, as described in reference [6], on the dereverberated audio signal, and subsequently performing beat time analysis, as described in reference [4], on the dereverberated audio signal. Furthermore, in some embodiments, downbeat time analysis may be performed as described below. It will be understood, therefore, that in some embodiments the audio analysis module 602 is configured to perform the audio analysis operations described in references [6] and [4].

Improved accuracy may be achieved also when performing other types of audio analysis such as those described above. For example, the audio analysis module 602, 702 may be configured to perform audio event recognition analysis on one of the original audio signal and the dereverberated audio signal and to perform audio event occurrence time determination analysis on the other one of the original audio signal and the dereverberated signal. Similarly, the audio analysis module 602 may be configured to perform chord detection analysis on one of the original audio signal and the dereverberated audio signal (when the signal is derived from a piece of music) and to determine the onset times of the detected chords using the other one of the dereverberated audio signal and the original audio signal.

Various operations and aspects of the audio signal processing apparatus 6, 7 described with reference to FIGS. 6 and 7 are discussed in more detail below.

Dereverberation

This section describes an algorithm which may be used by the dereverberation module 600 to produce a dereverberated version of an original audio signal. In this example, the original audio signal is derived from a recording of music event (or, put another way, is a music-derived signal) recording. The algorithm is configured to address "late reverberation" which is a major cause of degradation of the subjective quality of music signals as well as the performance of speech/music processing and analysis algorithms. Some variations of the algorithm, as discussed below, aim to preserve the beat structure against dereverberation and to increase the effectiveness of dereverberation by separating the transient component from the sustained part of the signal.

The algorithm is based on that described in reference [1], but includes a number of differences. These differences are discussed below in the "Discussion of Dereverberation Algorithm Section".

The short-time Fourier transform (STFT) of late reverberation of frame j of an audio signal can be estimated as the sum of previous K frames:

$$|R(\omega, j)| = \sum_{l=1}^{K} a(w, l)|Y(w, j-l)| \quad \text{Equation 1}$$

where a(ω,l) are the autoregressive coefficients (also known as linear prediction coefficients) for spectra of previous frames, Y(ω,j−l) is the STFT of the original audio signal in frequency bin ω and K previous frames are used. Note that frames of the original audio signal containing reverberation are used in this process. The process can be seen as a Finite Impulse Response (FIR) filter, as the output (R(ω,j)) is estimated as a weighted sum of a finite number of previous values of the input (Y(ω,j−l)). The number of preceding frames may be based on the reverberation time of the reverberation contained in the audio signal.

When performing dereverberation, the dereverberation module 600 is configured to divide the original audio signal containing reverberation into a number of overlapping frames (or segments). The frames may be windowed using, for example, a Hanning window.

Next, the dereverberation module 600 determines, for each frame of the original audio signal, the absolute value of the STFT, Y(ω,j).

Subsequently, the dereverberation module 600 generates, for each frame j, the dereverberated signal (or its absolute magnitude spectrum). This may be performed by, for each frame, subtracting STFT of the estimated reverberation from the STFT of the current frame, Y(ω,j), of the original audio signal. Put another way, the below spectral subtraction may be performed:

$$|S(\omega,j)|=|Y(w,j)|-\beta|R(w,j)| \quad \text{Equation 2}$$

where S(ω,j), Y(ω,j), R(ω,j) are the dereverberated signal, the original signal and the estimated reverberation, respectively, for frame j in frequency bin ω and where β is a scaling factor used to account for reverberation.

The dereverberation module 600 may be configured to disregard terms which are below a particular threshold. Consequently, terms which are too small (e.g. close to zero or even lower than zero) are avoided and so do not occur in the absolute magnitude spectra. Spectral subtraction typically causes some musical noise.

The original phases of the original audio signal may be used when performing the dereverberated signal generation process. The generation may be performed in an "overlap-add" manner.

Parameter/Coefficient Estimation

When determining R(ω,j) (i.e. the late reverberation of the frames) and, subsequently, the dereverberated signal S(ω,j), the dereverberation module 600 estimates the required coefficients and parameters. The coefficients a(ω,l) may be estimated, for example, using a standard least squares (LS) approach. Alternatively, since a(ω,l) should be (in theory) non-negative, a non-negative LS approach may be used. The coefficients may be estimated for each FFT bin separately or using a group of bins, for example, divided into Mel scale. In this way, the coefficients inside one band are the same. The dereverberation module 600 may be configured to perform the spectral subtraction of Equation 2 in the FFT domain, regardless of the way in which the coefficients a(ω,l) are estimated.

The parameter β may be set heuristically. Typically β is set between 0 and 1, for example 0.3, in order to maintain the inherent temporal correlation present in music signals.

Discussion of the Dereverberation Algorithm

The dereverberation process described above is similar to that presented in reference [1]. However, the dereverberation module 600 may be configured so as to retain "early reverberation" in the original audio signal, whereas in reference [1] it is removed. Specifically, in reference [1], inverse filtering is performed as the first step and the above described dereverberation process is performed in respect of the filtered versions of Y(ω,j−l). In contrast, the reverberation module 600 may be configured to perform the dereverberation process in respect of the unfiltered audio signal. This is contrary to current teaching in the subject area. The dereverberation module 600 may be configured to use an Infinite Impulse Response (IIR) filter instead of the FIR filter, discussed above, in instances in which filtered versions of previous frames are used. This, however, can cause some stability problems and may also reduce the quality, and so may not be ideal.

In addition, the dereverberation module 600 may be configured to calculate the linear prediction coefficients, a(ω,l), using standard least-squares solvers. In contrast, in reference [1], a closed-form solution for the coefficients is utilised.

The optimal parameters for the dereverberation method depend on the goal, that is, 3*o* whether the goal is to enhance the audible quality of the audio signal or whether the goal is to improve the accuracy of automatic analyses. For example, for improving beat tracking accuracy in reverberant conditions when using the beat tracking method described above, the following parameters of the dereverberation method may be used: frame length 120 ms, K=1, using 128 mel bands, and β=0.2. It will, of course, be appreciated that these parameters are examples only and that different values may be utilized depending on, for example, the purpose of the audio analysis algorithm that is to be implemented after the dereverberation.

Modifications to the Dereverberation Algorithm

The dereverberation module 600 may be configured to perform one or more variations of the dereverberation method described above. For example, dereverberation may be implemented using non-constant dereverberation weightings β. Also or alternatively, dereverberation may be performed only in respect of the non-sinusoidal part of signal. Also or alternatively, the prediction of the linear prediction coefficients may be determined differently so as to preserve the rhythmic structure that is often present in music.

The dereverberation module 600 may be configured to perform dereverberation on the different frequency bands in a non-similar manner (i.e. non-similarly). As such, the β-parameter may not be constant but, instead, one or more different values may be used for different frequency bands when performing dereverberation. In some cases, a different value may be used for each frequency band. In some cases it may be desirable to designate more dereverberation (i.e. a higher β-value) on either the low or the high frequency part of the signal because, for example, the dereverberation for low frequencies may be more critical. The exact parameters may be dependent on the quality of the audio signal supplied to the apparatus and the characteristics therein. The exact parameter values may be adjusted via experimentation or, in some cases, automatic simulations, such as by modifying the dereverberation parameters and analyzing the audio analysis accuracy (for example, such as beat tracking success) or an objective audio signal quality metric such as Signal to Distortion Ratio (SDR).

In other cases, a central region of the frequency domain might be more or less important for dereverberation than the frequency domain edge regions. As such, the dereverberation module 602 may be configured to apply a raised Hanning window-shaped β-weighting to the dereverberation of magnitude spectrum. Depending on the nature and quality of the incoming original audio signal, this may improve the accuracy of the results of the audio analysis.

In the case of some audio signals, the perceptual quality of an audio signal could be improved by applying a filtering technique that attenuates resonant frequencies. As such, the dereverberation module may be configured to apply such filters to the audio signal prior to performing dereverberation. Alternatively or additionally, the apparatus 6 may be configured to perform one or more of the following actions, which could improve the accuracy of the analysis:

- employing an auditory masking model in sub-bands to extract the reverberation masking index (RMI) which identifies signal regions with perceived alterations due to late reverberation (as described in reference [3]);
- removing the early reverberation before estimating the parameters and coefficients in order to improve the beat tracking performance;
- setting the parameter β adaptively (i.e. using β(ω,l)); and
- implementing constant Q transform-based frequency-domain prediction.

Feedback from Audio Analysis Module to Dereverberation Module

As described above and denoted on FIG. 6 by the dotted line, in some embodiments, there may be feedback from the audio analysis module 602 to the dereverberation module 600. More specifically, the dereverberation of the original audio signal may be performed on the basis of (or, put another way, taking into account) the results of the audio analysis of the original audio signal.

In one specific example, the audio analysis module 602 may be configured to perform beat period determination analysis on the original audio signal and to provide the determined beat period to the dereverberation module, thereby to improve performance of the system in preserving important audio qualities, such as the beat pulse.

In this example, the dereverberation module 602 may be configured to exclude certain coefficients, which correspond to delays matching observed beat periods (as provided by the audio analysis module 602) when estimating the linear prediction coefficients. This may prevent the rhythmic structure of the audio signal being destroyed by the dereverberation process. In some other embodiments, coefficients corresponding to integer multiples or fractions of the observed beat periods could be excluded.

In such examples, the reverberation estimation model may be changed to:

$$|R(\omega, j)| = \sum_{\substack{l=1 \\ l \neq k-\tau}}^{K} a(w, l)|Y(w, j-l)|$$

where τ is the determined beat period, in frames, as provided by the audio analysis module 602.

In these examples, α(ω,l) is estimated using linear prediction with the limitation that l≠k·τ. Put another way, the coefficients α(ω,k·τ) are not taken into account in the linear prediction but are instead set to zero.

In some other embodiments, such as those described with reference to FIG. 7, there may also be feedback from the audio analysis module 702 to the dereverberation module 600. In these examples, however, two or more iterations of dereverberation may be performed by the dereverberation module 600. The first iteration may be performed before any audio analysis by the audio analysis module 702 has taken place. A second, or later, iteration may be performed after audio analysis by one or both of the first and second sub-modules 704, 706 has been performed. The second iteration of dereverberation may use the results of audio analysis performed on the dereverberated signal and/or the results of the audio analysis performed on the original audio signal.

Sinusoidal Modeling

In some examples, the apparatus 6, 7 is configured to pre-process the incoming original audio signal using sinusoidal modeling. More specifically sinusoidal modeling may be used to separate the original audio signal into a sinusoidal component and a noisy residual component (this is described in reference [2]). The dereverberation module 600 then applies the dereverberation algorithm to the noisy residual component. The result of this is then added back to the sinusoidal component. This addition is performed in such a way that the dereverberated noisy residual component and the sinusoidal component remain synchronized.

This approach is based on the idea that the transient parts of an audio signal best describe the reverberation effects (in contrast to sustained portions) and so should be extracted and used to derive a reverberation model. As such, the use of sinusoidal modeling may improve the performance of the dereverberation module 600, and of the whole apparatus 6 or 7.

Beat Period Determination Analysis

As described above, the audio analysis module 602, 702 may be configured to perform beat period determination analysis. An example of this analysis is described below with reference to the audio signal processing apparatus 7 of FIG. 7.

Accent Signal Generation

The first sub-module 704 may be configured, as a first step, to use the dereverberated audio signal generated by the dereverberation module 702 to calculate a first accent signal ($a_1$). The first accent signal ($a_1$) may be calculated based on fundamental frequency ($F_o$) salience estimation. This accent signal ($a_1$), which is a chroma accent signal, may be extracted as described in reference [6]. The chroma accent signal ($a_1$) represents musical change as a function of time and, because it is extracted based on the $F_o$ information, it emphasizes harmonic and pitch information in the signal. Note that, instead of calculating a chroma accent signal based on $F_o$ salience estimation, alternative accent signal representations and calculation methods may be used. For example, the accent signal may be calculated as described in either of references [5] and [4].

The first sub-module 704 may be configured to perform the accent signal calculation method using extracted chroma features. There are various ways to extract chroma features, including, for example, a straightforward summing of Fast Fourier Transform bin magnitudes to their corresponding pitch classes or using a constant-Q transform. In one example, a multiple fundamental frequency ($F_o$) estimator may be used to calculate the chroma features. The $F_o$ estimation may be done, for example, as proposed in reference [9]. The dereverberated audio signal may have a sampling rate of 44.1-kHz and may have a 16-bit resolution. Framing may be applied to the dereverberated audio signal by dividing it into frames with a certain amount of overlap. In one specific implementation, 93-ms frames having 50% overlap may be used. The first audio analysis sub-module 704 may be configured to spectrally whiten the signal frame, and then to estimate the strength or salience of each $F_o$ candidate. The $F_o$ candidate strength may be calculated as a weighted sum of the amplitudes of its harmonic partials. The range of fundamental frequencies used for the estimation may be, for example, 80-640 Hz. The output of the $F_o$ estimation step may be, for each frame, a vector of strengths of fundamental frequency candidates. In some examples, the fundamental frequencies may be represented on a linear frequency scale. To better suit music signal analysis, the fundamental frequency saliences may be transformed on a musical frequency scale. In particular, a frequency scale having a resolution of ⅓$^{rd}$-semitones, which corresponds to having 36 bins per octave, may be used. For each ⅓rd of a semitone range, the first sub-module 704 may be configured to find the fundamental frequency component with the maximum salience value and to retain only that component. To obtain a 36-dimensional chroma vector $x_b(k)$, where k is the frame index and b=1, 2, . . . , $b_o$ is the pitch class index, with $b_0$=36, the octave equivalence classes may be summed over the whole pitch range. A normalized matrix of chroma vectors $\hat{x}_b(k)$ may then be obtained by subtracting the mean and dividing by the standard deviation of each chroma coefficient over the frames k.

Next, the first sub-module 704 may perform estimation of musical accent using the normalized chroma matrix $\hat{x}_b(k)$, k=1, . . . , K and b=1, 2, . . . , $b_o$. To improve the time resolution, the time trajectories of chroma coefficients may be first interpolated by an integer factor. In one example, interpolation by the factor eight may be used. A straightforward method of interpolation by adding zeros between samples may be used. With the parameters listed above, after the interpolation, the resulting sampling rate is $f_r$=172 Hz. This may be followed by a smoothing step, which may be done by applying a sixth-order Butterworth low-pass filter (LPF). The LPF may have a cut-off frequency of $f_{LP}$=10 Hz. The signal after smoothing may be denoted as $z_b(n)$. Subsequently, differential calculation and half-wave rectification (HWR) may be performed using:

$$\acute{z}_b(n)=HWR\{z_b(n)-z_b(n-1)\} \qquad \text{Equation 4}$$

with HWR(x)=max(x,0).

Next, a weighted average of $z_b(n)$ and its half-wave rectified differential $\acute{z}_b(n)$ is calculated. The resulting signal is $$u_b(n) = (1-\rho)z_b(n) + \rho\frac{f_r}{f_{LP}}z_b'(n) \qquad \text{Equation 5}$$

In Equation 5, the factor $0\le\rho\le1$ controls the balance between $z_b(n)$ and its half-wave rectified differential. In some examples, a value of $\rho$=0.6 may be used. In one example, an accent signal $a_1$ may be obtained based on the above accent signal analysis by linearly averaging the bands b. Such an accent signal represents the amount of musical emphasis or accentuation over time.

Tempo Estimation

After calculating the accent signal $a_1$, the first sub-module 702 may estimate the dereverberated audio signal's tempo (hereafter "$BPM_{est}$") for example as described in reference [6].

The first step in the tempo estimation is periodicity analysis. The periodicity analysis is performed on the accent signal ($a_1$). The generalized autocorrelation function (GACF) is used for periodicity estimation. To obtain periodicity estimates at different temporal locations of the signal, the GACF may be calculated in successive frames. In some examples, the length of the frames is W and there is 16% overlap between adjacent frames. Windowing may, in some examples, not be used. At the $m^{th}$ frame, the input vector for the GACF is denoted $a_m$:

$$a_m=[a_1((m-1)W), \ldots ,a_1(mW-1),0, \ldots ,0]^T \qquad \text{Equation 6}$$

where T denotes transpose. The input vector is zero padded to twice its length, thus, its length is 2 W. The GACF may be defined as:

$$\gamma_m(\tau)=IDFT(|DFT(a_m)|^p) \qquad \text{Equation 7}$$

where the discrete Fourier transform and its inverse are denoted by DFT and IDFT, respectively. The amount of frequency domain compression is controlled using the coefficient p. The strength of periodicity at period (lag) $\tau$ is given by $\gamma_m(\tau)$.

Other alternative periodicity estimators to the GACF include, for example, inter onset interval histogramming, autocorrelation function (ACF), or comb filter banks. Note that the conventional ACF may be obtained by setting p=2 in Equation 6. The parameter p may need to be optimized for different accent features. This may be done, for example, by experimenting with different values of p and evaluating the accuracy of period estimation. The accuracy evaluation may be done, for example, by evaluating the tempo estimation accuracy on a subset of tempo annotated data. The value which leads to best accuracy may be selected to be used. For the chroma accent features used here, we can use, for example, the value p=0.65, which was found to perform well in this kind of experiment.

After periodicity estimation, there exists a sequence of periodicity vectors from adjacent frames. To obtain a single representative period and tempo for a musical piece or a segment of music, a point-wise median of the periodicity vectors over time may be calculated. The median periodicity vector may be denoted by $\gamma_{med}(\tau)$. Furthermore, the median periodicity vector may be normalized to remove a trend.

$$\hat{\gamma}_{med}(\tau) = \frac{1}{W-\tau}\gamma_{med}(\tau) \qquad \text{Equation 8}$$

The trend is caused by the shrinking window for larger lags. A sub-range of the periodicity vector may be selected as the final periodicity vector. The sub-range may be taken as the range of bins corresponding to periods from 0.06 to 2.2 s, for example. Furthermore, the final periodicity vector may be normalized by removing the scalar mean and normalizing the scalar standard deviation to unity for each periodicity vector. The periodicity vector after normalization is denoted by $s(\tau)$. Note that instead of taking a median periodicity vector over time, the periodicity vectors in frames may be outputted and subjected to tempo estimation separately.

Tempo (or beat period) estimation may then be performed based on the periodicity vector $s(\tau)$. The tempo estimation may be done using k-nearest neighbour regression. Other tempo estimation methods may be used instead, such as methods based on determining the period corresponding to the maximum periodicity value, possibly weighted by the prior distribution of various tempi.

Let's denote the unknown tempo of this periodicity vector with T. The tempo estimation may start with generation of re-sampled test vectors $s_r(\tau)$. Here, r denotes the re-sampling ratio. The re-sampling operation may be used to stretch or shrink the test vectors, which has in some cases been found to improve results. Since tempo values are continuous, such re-sampling may increase the likelihood of a similarly shaped periodicity vector being found from the training data. A test vector re-sampled using the ratio r will correspond to a tempo of T/r. A suitable set of ratios may be, for example, 57 linearly spaced ratios between 0.87 and 1.15. The re-sampled test vectors correspond to a range of tempi from 104 to 138 BPM for a musical excerpt having a tempo of 120 BPM.

The tempo estimation may comprise calculating the Euclidean distance between each training vector $t_m(\tau)$ and the re-sampled test vectors $s_r(\tau)$:

$$d(m,r)=\sqrt{\Sigma_\tau(t_m(\tau)-s_r(\tau))^2} \quad \text{Equation 9}$$

In Equation 9, m=1, . . . , M is the index of the training vector. For each training instance m, the minimum distance $d(m)=\min_r d(m,r)$ may be stored. Also the re-sampling ratio that leads to the minimum distance $\hat{r}(m)=\operatorname{argmin}_r d(m,r)$ may be stored. The tempo may then be estimated based on the k nearest neighbors that lead to the k lowest values of d(m). The reference or annotated tempo corresponding to the nearest neighbor i is denoted by $T_{ann}(i)$. An estimate of the test vector tempo is obtained as $\hat{T}(i)=T_{ann}(i)\hat{r}(i)$.

The tempo estimate may be obtained as the average or median of the nearest neighbour tempo estimates $\hat{T}(i)$, i=1, . . . , k. Furthermore, weighting may be used in the median calculation to give more weight to those training instances that are closest to the test vector. For example, weights $w_i$ may be calculated as $$w_i = \frac{\exp(-\theta d(i))}{\sum_{i=1}^{k} \exp(-\theta d(i))} \quad \text{Equation 10}$$

where i=1, . . . , k. The parameter θ may be used to control the steepness of the weighting. For example, the value θ=0.01 can be used. The tempo estimate $BPM_{est}$ may then be calculated as a weighted median of the tempo estimates $\hat{T}(i)$, i=1, . . . , k, using the weights $w_i$.

Beat Time Determination Analysis

Referring still to FIG. 7, the second sub-module 706 may be configured to perform beat time determination analysis using the $BPM_{est}$ calculated by the first sub-module 704 and a second chroma accent signal $a_2$. The second chroma accent signal $a_2$ is calculated by the second sub-module 706 similarly to calculation of the first chroma accent signal $a_1$ by the first sub-module 704. However, the second sub-module 706 is configured to calculate the second chroma accent signal $a_2$ based on the original audio signal, whereas the first sub-module is configured to calculate the first chroma accent signal $a_1$ based on the dereverberated audio signal.

The output of the beat time determination analysis is a beat time sequence $b_1$ indicative of beat time instants. In order to calculate the beat time sequence a dynamic programming routine similar to that described in reference [4] may be used. This dynamic programming routine identifies the first sequence of beat times $b_1$ which matches the peaks in the second chroma accent signal $a_2$ allowing the beat period to vary between successive beats. Alternative ways of obtaining the beat times based on a BPM estimate may be used. For example, hidden Markov models, Kalman filters, or various heuristic approaches may be used. A benefit of the dynamic programming routine is that it effectively searches all possible beat sequences.

For example, the second sub-module 706 may be configured to use the $BPM_{est}$ to find a sequence of beat times so that many beat times correspond to large values in the accent signal ($a_2$). As suggested in reference [4], the accent signal is first smoothed with a Gaussian window. The half-width of the Gaussian window may be set to be equal to 1/32 of the beat period corresponding to $BPM_{est}$.

After the smoothing, the second sub-module 706 may use the dynamic programming routine to proceed forward in time through the smoothed accent signal values ($a_2$). Let's denote the time index n. For each index n, second sub-module 706 finds the best predecessor beat candidate. The best predecessor beat is found inside a window in the past by maximizing the product of a transition score and a cumulative score. Put another way, the second sub-module 706 calculates:

$$\delta(n)=\max_r(ts(l)\cdot sc(n+l)) \quad \text{Equation 11}$$

where ts(l) is the transition score and cs(n+l) the cumulative score. The search window spans from l=−round(−2P), . . . , −round(P/2), where P is the period in samples corresponding to $BPM_{est}$. The transition score may be defined as:

$$ts(l) = \exp\left(-0.5\left(\theta * \log\left(\frac{l}{-p}\right)\right)^2\right) \quad \text{Equation 12}$$

where l=−round(−2P), . . . , −round(P/2) and the parameter θ (which in this example equals 8) controls how steeply the transition score decreases as the previous beat location deviates from the beat period P. The cumulative score is stored as $cs(n)=\alpha\delta(n)+(1-\alpha)\alpha_1(n)$. The parameter a is used to keep a balance between past scores and a local match. The value α may be equal 0.8. The second sub-module 706 may also store the index of the best predecessor beat as $b(n)=n+\hat{l}$, where $\hat{l}=\operatorname{argmax}_l(ts(l)\cdot cs(n+l))$.

In the end of the musical excerpt, the best cumulative score within one beat period from the end is chosen, and then the entire beat sequence $B_1$ which caused the score is traced back using the stored predecessor beat indices. The best cumulative score may be chosen as the maximum value of the local maxima of the cumulative score values within one beat period from the end. If such a score is not found, then the best cumulative score is chosen as the latest local maxima exceeding a threshold. In some examples, the threshold may be 0.5 times the median cumulative score value of the local maxima in the cumulative score.

In some examples, the beat sequence obtained by the second sub-module 706 may be used to update the $BPM_{est}$. For example, the $BPM_{est}$ may be updated based on the median beat period calculated based on the beat times obtained from the dynamic programming beat tracking step. As such, in some examples, the results of the analysis performed by the first sub-module 704 may be updated based on the results of the analysis performed by the second sub-module 706.

Downbeat Analysis

In some embodiments, the resulting beat times $B_1$ may be used as input for the downbeat determination stage. Ultimately, the task is to determine which of these beat times correspond to downbeats, that is the first beat in the bar or measure. A method for identifying downbeats is described below. It will be appreciated however that alternative methods for identifying downbeats may instead be used. Downbeat analysis may be performed by the audio analysis module 602, 702 or by another module, which is not shown in the Figures.

Chroma Difference Calculation & Chord Change Possibility

A first part in the downbeat determination analysis may calculate the average pitch chroma at the aforementioned beat locations. From this a chord change possibility can be inferred. A high chord change possibility is considered indicative of a downbeat. Each step will now be described.

Beat Synchronous Chroma Calculation

The chroma vectors and the average chroma vector may be calculated for each beat location/time. The average chroma vectors are obtained in the accent signal calculation step for beat tracking as performed by the second sub-module 706 of the apparatus 7.

Chroma Difference Calculation

Next, a "chord change possibility" may be estimated by differentiating the previously determined average chroma vectors for each beat location/time.

Trying to detect chord changes is motivated by the musicological knowledge that chord changes often occur at downbeats. The following function may be used to estimate the chord change possibility:

$$\text{Chord\_change}(t_i) = \sum_{j=1}^{12}\sum_{k=1}^{3}|\bar{c}_j(t_i)-\bar{c}_j(t_{i-k})| - \sum_{j=1}^{12}\sum_{k=1}^{3}|\bar{c}_j(t_i)-\bar{c}_j(t_{i+k})| \quad \text{Equation 13}$$

The first sum term in Chord_change($t_i$) represents the sum of absolute differences between the current beat chroma vector $\bar{c}(t_i)$ and the three previous chroma vectors. The second sum term represents the sum of the next three chroma vectors. When a chord change occurs at beat $t_i$, the difference between the current beat chroma vector $\bar{c}(t_i)$ and the three previous chroma vectors will be larger than the difference between $\bar{c}(t_i)$ and the next three chroma vectors. Thus, the value of Chord_change($t_i$) will peak if a chord change occurs at time $t_i$.

Chroma Accent and Multi-Rate Accent Calculation

Another accent signal may be calculated using the accent signal analysis method described in [5]. This accent signal is calculated using a computationally efficient multi-rate filter bank decomposition of the signal.

When compared with the previously described $F_o$ salience-based accent signal, this multi-rate accent signal relates more to drum or percussion content in the signal and does not emphasise harmonic information. Since both drum patterns and harmonic changes are known to be important for downbeat determination, it is attractive to use/combine both types of accent signals.

Linear Discriminant Analysis (LDA) Transform of Accent Signals

In the next step, separate LDA transforms at beat time instants are performed on the accent signals to obtain a downbeat likelihood for each beat instance.

LDA analysis involves a training phase based on which transform coefficients are obtained. The obtained coefficients are then used during operation of the system to determine downbeats (also known as the online operation phase). In the training phase, LDA analysis may be performed twice, separately for each of the salience-based chroma accent signal and the multi-rate accent signal. In the training phase, a database of music with annotated beat and downbeat times is utilized for estimating the necessary coefficients (or parameters) for use in the LDA transform.

LDA Training Stage

The training method for both LDA transform stages may be performed follows:

1) sample the accent signal at beat positions;

2) go through the sampled accent signal at one beat steps, taking a window of four beats in turn;

3) if the first beat in the window of four beats is a downbeat, add the sampled values of the accent signal corresponding to the four beats to a set of positive examples;

4) if the first beat in the window of four beats is not a downbeat, add the sampled values of the accent signal corresponding to the four beats to a set of negative examples;

5) store all positive and negative examples. In the case of the chroma accent signal, each example is a vector of length four;

6) after all the data has been collected (from a catalogue of songs with annotated beat and downbeat times), perform LDA analysis to obtain the transform matrices.

When training the LDA transform, it may be advantageous to take as many positive examples (of downbeats) as there are negative examples (not downbeats). This can be done by randomly picking a subset of negative examples and making the subset size match the size of the set of positive examples.

7) collect the positive and negative examples in an M by d matrix [X]. M is the number of samples and d is the data dimension. In the case of the chroma accent signal, $d=_{4}$.

9) Normalize the matrix [X] by subtracting the mean across the rows and dividing by the standard deviation.

10) Perform LDA analysis as is known in the art to obtain the linear coefficients W. Store also the mean and standard deviation of the training data. These mean and standard deviation values are used for normalizing the input feature vector in the online system operation phase.

Obtaining Downbeat Likelihoods Using the LDA Transform

In the online system operation phase, when the downbeats need to be analyzed from an input music-derived audio signal, the downbeat analysis using LDA may be done as follows:

- for each recognized beat time, a feature vector x of the accent signal value at the beat instant and three next beat time instants is constructed;
- subtract the mean from the feature vector x and then divide by the standard deviation of the training data;
- calculate a score xx W for the beat time instant, where x is a 1×d input feature vector and W is the linear coefficient vector of size d by 1.

A high score may indicate a high downbeat likelihood and a low score may indicate a low downbeat likelihood.

In the case of the chroma accent signal, the dimension d of the feature vector is 4, corresponding to one accent signal sample per beat. In the case of the multi-rate accent signal, the accent has four frequency bands and the dimension of the feature vector is 16.

The feature vector is constructed by unraveling the matrix of band-wise feature values into a vector.

In the case of time signatures other than 4/4, the above processing (both for training and online system operation) is modified accordingly. For example, when training a LDA transform matrix for a ¾ time signature, the accent signal is travelled in windows of three beats. Several such transform matrices may be trained, for example, one corresponding to each time signature under which the system needs to be able to operate.

Downbeat Candidate Scoring and Downbeat Determination

When the audio has been processed using the above-described steps, an estimate for the downbeat may generated by applying the chord change likelihood and the first and second accent-based likelihood values in a non-causal manner to a score-based algorithm. Before computing the final score, the chord change possibility and the two downbeat likelihood signals may be normalized by dividing with their maximum absolute value.

The possible first downbeats are $t_1$, $t_2$, $t_3$, $t_4$, and the one that is selected may be the one which maximizes the below equation:

$$\text{score}(t_n) = \frac{1}{\text{card}(S(t_n))}\sum_{j \in S(t_n)} (w_c \text{Chord\_change}(j) + w_a a(j) + w_m m(j)), \quad n = 1, \ldots, 4 \qquad \text{Equation 14}$$

where: $S(t_n)$ is the set of beat times $t_n$, $t_{n+4}$, $t_{n+8}$, . . . .

$w_c$, $w_a$, and $W_m$ are the weights for the chord change possibility, chroma accent based downbeat likelihood, and multi-rate accent based downbeat likelihood, respectively.

It should be noted that the above scoring function of Equation 14 is adapted specifically for use with a 4/4 time signature. In the case of a ¾ time signature, for example, the summation may be performed across every three beats.

Application to Analysis of Music and Speech signals

In the above-described examples, the dereverberation and audio analysis has primarily been described in relation to music-derived audio signals. However, in some examples, the audio analysis apparatus (for example, that shown in FIG. 6) may be configured to analyze both speech-derived and music-derived audio signals. In such examples, the first sub-module 604 of the audio analysis module 602 may be configured to determine whether the original audio signal is a speech-derived signal or a music-derived signal. This may be achieved using any suitable technique, such as the one described in reference [10].

The output of the first sub-module 604, which indicates whether the signal is speech-derived or music-derived, is then passed to the dereverberation module 602. The parameters/coefficients for the dereverberation algorithm are selected based on the indication provided by the first sub-module 604, so as to be better-suited to the type of audio signal. For example, a speech-specific dereverberation method and/or parameters may be selected if the input signal is determined to contain speech, and a music specific dereverberation method and/or parameters may be selected if the input more likely contains music. The dereverberation module 602 then performs the dereverberation using the selected parameters/coefficients. The resulting dereverberated audio signal is then passed to the second sub module 606 of the audio analysis module 602. The type of analysis performed by the second sub-module 606 is based upon the output of the first sub-module 604 (i.e. whether the audio signal is speech-derived or music-derived). For example, if a music-derived audio signal is indicated, the second sub-module 606 may respond, for example, by performing beat period determination analysis (or some other music-orientated audio analysis) on the dereverberated signal. If a speech-derived audio signal is indicated, the second sub-module 606 may respond by performing speaker recognition or speech recognition.

Figure 8:
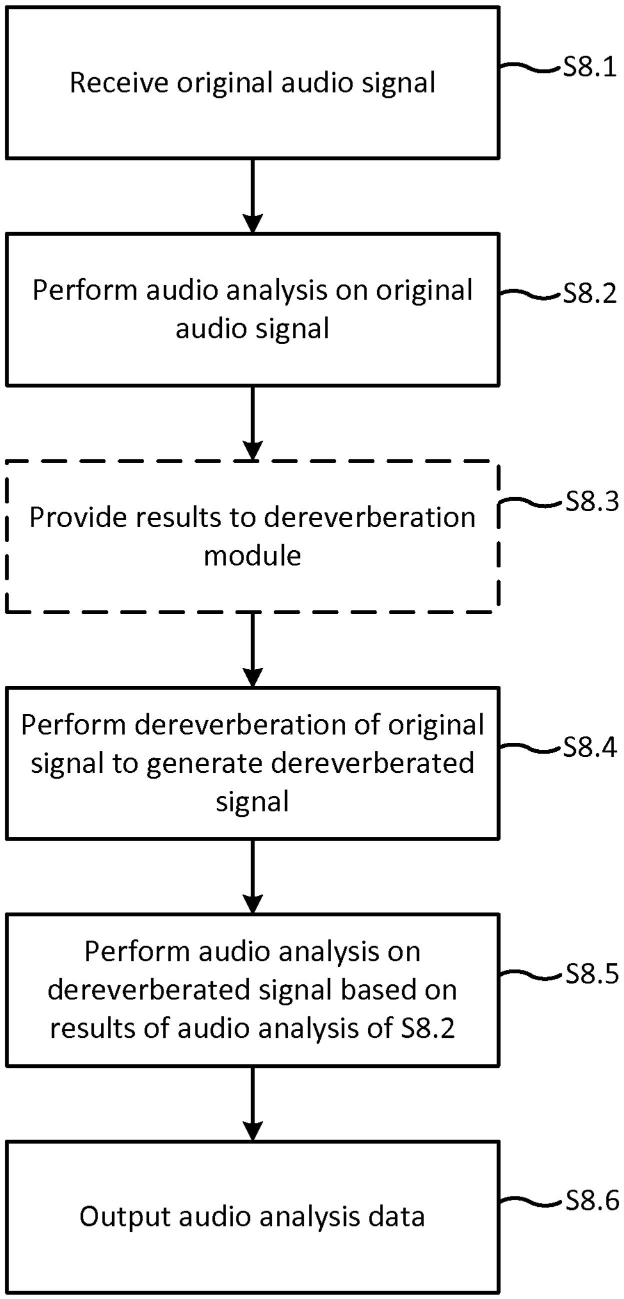
FIG. 8 is a flow chart illustrating an example of a method which may be performed by the functional elements of FIG. 6.

FIG. 8 is a flow chart depicting an example of a method that may be performed by the apparatus of FIG. 6.

In step S8.1, the original audio signal is received. This may have been received from a user terminal, such as any of terminals 100, 102, 104 shown in FIGS. 1 to 4.

In step S8.2, the first sub-module 604 of the audio analysis module 602 performs audio analysis on the original audio signal. In some examples, the audio analysis performed in respect of the original audio signal is a first part of a multi-part audio analysis process.

Optionally, in step S8.3, the output of the first sub-module 604 is provided to the dereverberation module 600.

In step S8.4, the dereverberation module 600 performs dereverberation of the original audio signal to generate a dereverberated audio signal. The dereverberation of the original signal may be performed based on the output of the first sub-module 604 (i.e. the results of the audio analysis of the original audio signal).

In step S8.5, the second sub-module 606 of the audio analysis module 602 performs audio analysis on the dereverberated audio signal generated by the reverberation module 600. The audio analysis performed in respect of the dereverberated audio signal uses the results of the audio analysis performed in respect of the original audio signal in step S2. The audio analysis performed in respect of the dereverberated audio signal may be the second step in the multi-step audio analysis mentioned above.

Next, in step S8.6, the second sub-module 606 provides audio analysis data. This data may be utilised in a number of different ways, some of which are described above. For example, the audio analysis data may be used by the analysis server 500 in at least one of automatic video editing, audio synchronized visualizations, and beat-synchronized mixing of audio signals.

Figure 9:
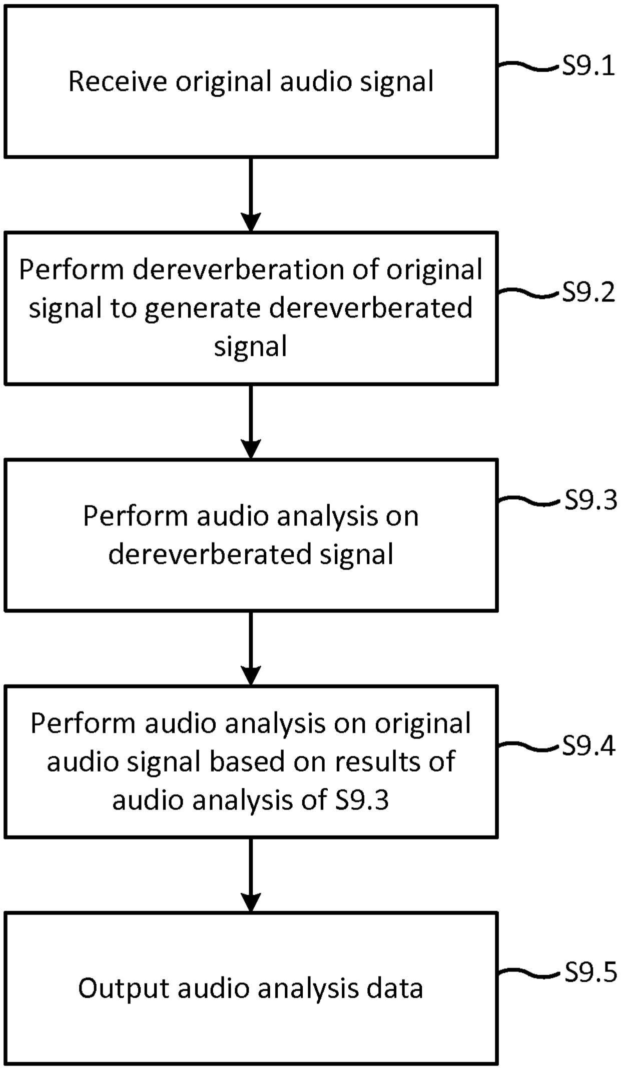
FIG. 9 is a flow chart illustrating an example of a method which may be performed by the functional elements of FIG. 7.

FIG. 9 is a flow chart depicting an example of a method that may be performed by the apparatus of FIG. 7.

In step S9.1, the original audio signal is received. This may have been received from a user terminal, such as any of terminals 100, 102, 104 shown in FIGS. 1 to 4.

In step 9.2, the dereverberation module 600 performs dereverberation of the original audio signal to generate a dereverberated audio signal.

In step S9.3, the first sub-module 704 of the audio analysis module 702 performs audio analysis on the dereverberated audio signal generated by the reverberation module 600. In some examples, the audio analysis performed in respect of the dereverberated audio signal is a first part of a multi-part audio analysis process.

In step S9.4, the second sub-module 706 of the audio analysis module 702 performs audio analysis on the original audio signal. The audio analysis performed in respect of the original audio signal uses the results of the audio analysis performed in respect of the dereverberated audio signal in step S9.3. The audio analysis performed in respect of the original audio signal may be the second step in the multi-step audio analysis mentioned above.

Next, in step S9.5, the second sub-module 706 provides audio analysis data. This data may be utilised in a number of different ways, some of which are described above. For example, the audio analysis data may be used by the analysis server 500 in at least one of automatic video editing, audio synchronized visualizations, and beat-synchronized mixing of audio signals.

As mentioned above, in some examples, the results of the audio analysis from either of the first and second sub-modules 704, 706 (as calculated in steps S9.3 and S9.4 respectively) may be provided to the dereverberation module 600. One or more additional iterations of dereverberation may be performed by the dereverberation module 600 based on these results.

The methods illustrated in FIGS. 8 and 9 are examples only. As such, certain steps (such as step S8.3) may be omitted. Similarly, some steps may be performed in a different order or simultaneously, where appropriate.

It will of course be appreciated that the functionality of the audio signal processing apparatus 6, 7 (and optionally also of whole analysis server 500) may be provided by a user terminal, which may be similar to those 100, 102, 104 described with reference to FIGS. 1 to 4.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:

generating a dereverberated audio signal based on an original audio signal containing reverberation; and generating audio analysis data based on audio analysis of the original audio signal and audio analysis of the dereverberated audio signal, wherein the audio analysis comprises performing one of:

beat period determination analysis using a beat period determination algorithm; beat time determination analysis using a beat time determination algorithm; downbeat determination analysis using a downbeat determination algorithm; structure analysis using a structure analysis algorithm; chord analysis using a chord analysis algorithm; key determination analysis using a key determination algorithm; melody analysis using a melody analysis algorithm; multi-pitch analysis using a multi-pitch analysis algorithm; automatic music transcription analysis using an automatic music transcription analysis algorithm; audio event recognition analysis using an audio event recognition analysis algorithm; and timbre analysis using a timbre analysis algorithm, in respect of at least one of the original audio signal and the dereverberated audio signal;

performing beat period determination analysis, by using a beat period determination algorithm, on the dereverberated audio signal; and performing beat time determination analysis, by using a beat time determination algorithm, on the original audio signal.

2. The method of claim 1, comprising performing audio analysis using the original audio signal and the dereverberated audio signal.

3. The method of claim 1, comprising performing audio analysis on one of original audio signal and the dereverberated audio signal based on results of the audio analysis of the other one of the original audio signal and the dereverberated audio signal.

4. The method of claim 3, comprising performing audio analysis on the original audio signal based on results of the audio analysis of the dereverberated audio signal.

5. The method of claim 1, comprising generating the dereverberated audio signal based on a feedback of at least one audio signal characteristic resulting from the audio analysis of the original audio signal.

6. The method of claim 1, comprising performing beat time determination analysis on the original audio signal based on results of the beat period determination analysis.

7. The method of claim 1, comprising analysing the original audio signal to determine if the original audio signal is derived from speech or from music and performing the audio analysis in respect of the dereverberated audio signal based on the determination as to whether the original audio signal is derived from speech or from music.

8. The method of claim 7, comprising selecting parameters used in the dereverberation of the original signal on the basis of the determination as to whether the original audio signal is derived from speech or from music.

9. The method of claim 1, comprising processing the original audio signal using sinusoidal modeling prior to generating the dereverberated audio signal.

10. The method of claim 9, comprising:

using sinusoidal modeling to separate the original audio signal into a sinusoidal component and a noisy residual component;

applying a dereverberation algorithm to the noisy residual component to generate a dereverberated noisy residual component; and summing the sinusoidal component to the dereverberated noisy residual component thereby to generate the dereverberated audio signal.

11. Apparatus comprising:

at least one processor; and at least one memory, having computer-readable code stored thereon, the at least one memory and the computer program code being configured to, with the at least one processor, cause the apparatus:

to generate a dereverberated audio signal based on an original audio signal containing reverberation;

to generate audio analysis data based on audio analysis of the original audio signal and audio analysis of the dereverberated audio signal, wherein the audio analysis comprises one of: beat period determination analysis using a beat period determination algorithm; beat time determination analysis using a beat time determination algorithm; downbeat determination analysis using a downbeat determination algorithm; structure analysis using a structure analysis algorithm; chord analysis using a chord analysis algorithm; key determination analysis using a key determination algorithm; melody analysis using a melody analysis algorithm; multi-pitch analysis using a multi-pitch analysis algorithm; automatic music transcription analysis using an automatic music transcription analysis algorithm; audio event recognition analysis using an audio event recognition analysis algorithm; and timbre analysis using a timbre analysis algorithm, in respect of at least one of the original audio signal and the dereverberated audio signal;

to perform beat period determination analysis, by using a beat period determination algorithm, on the dereverberated audio signal; and to perform beat time determination analysis, by using a beat time determination algorithm, on the original audio signal.

12. The apparatus of claim 11, the at least one memory and the computer program code being configured to, with the at least one processor, cause the apparatus:

to perform audio analysis using the original audio signal and the dereverberated audio signal.

13. The apparatus of claim 11, the at least one memory and the computer program code being configured to, with the at least one processor, cause the apparatus:

to perform audio analysis on one of original audio signal and the dereverberated audio signal based on results of the audio analysis of the other one of the original audio signal and the dereverberated audio signal.

14. The apparatus of claim 13, the at least one memory and the computer program code being configured to, with the at least one processor, cause the apparatus:

to perform audio analysis on the original audio signal based on results of the audio analysis of the dereverberated audio signal.

15. The apparatus of claim 11, the at least one memory and the computer program code being configured to, with the at least one processor, cause the apparatus:

to generate the dereverberated audio signal based on a feedback of at least one audio signal characteristic resulting from the audio analysis of the original audio signal.

16. The apparatus of claim 11, the at least one memory and the computer program code being configured to, with the at least one processor, cause the apparatus:

to perform the beat time determination analysis on the original audio signal based on results of the beat period determination analysis.

17. The apparatus of claim 11, the at least one memory and the computer program code being configured to, with the at least one processor, cause the apparatus:

to analyse the original audio signal to determine if the original audio signal is derived from speech or from music; and to perform the audio analysis in respect of the dereverberated audio signal based upon the determination as to whether the original audio signal is derived from speech or from music.

18. The apparatus of claim 17, the at least one memory and the computer program code being configured to, with the at least one processor, cause the apparatus:

to select the parameters used in the dereverberation of the original signal on the basis of the determination as to whether the original audio signal is derived from speech or from music.

19. The apparatus of claim 11, the at least one memory and the computer program code being configured to, with the at least one processor, cause the apparatus:

to process the original audio signal using sinusoidal modeling prior to generating the dereverberated audio signal.

20. The apparatus of claim 19, the at least one memory and the computer program code being configured to, with the at least one processor, cause the apparatus:

to use sinusoidal modeling to separate the original audio signal into a sinusoidal component and a noisy residual component;

to apply a dereverberation algorithm to the noisy residual component to generate a dereverberated noisy residual component; and to sum the sinusoidal component to the dereverberated noisy residual component thereby to generate the dereverberated audio signal.

* * * * *